United States Patent
Hegenbart et al.

(10) Patent No.: US 12,024,291 B2
(45) Date of Patent: Jul. 2, 2024

(54) COMPONENT SYSTEM FOR INTERIOR FURNISHING OF AN AIRCRAFT

(71) Applicant: Airbus Operations GmbH, Hamburg (DE)

(72) Inventors: Matthias Hegenbart, Hamburg (DE); Peter Linde, Hamburg (DE); Hermann Benthien, Hamburg (DE); Alexander Horn, Hamburg (DE); Florian Schmidt, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 111 days.

(21) Appl. No.: 17/785,677

(22) PCT Filed: Dec. 10, 2020

(86) PCT No.: PCT/EP2020/085574
§ 371 (c)(1),
(2) Date: Jun. 15, 2022

(87) PCT Pub. No.: WO2021/122322
PCT Pub. Date: Jun. 24, 2021

(65) Prior Publication Data
US 2023/0057345 A1    Feb. 23, 2023

(30) Foreign Application Priority Data
Dec. 17, 2019   (DE) .......................... 102019134746.7

(51) Int. Cl.
*B64D 11/00* (2006.01)
(52) U.S. Cl.
CPC .................. *B64D 11/003* (2013.01)
(58) Field of Classification Search
CPC ............................. B64D 11/00; B64D 11/003
See application file for complete search history.

(56) References Cited

U.S. PATENT DOCUMENTS 6,536,710 B1 * 3/2003 Bobzien ............... B64D 11/003
                                                    244/119
6,883,753 B1 * 4/2005 Scown ..................... B64C 1/06
                                                    244/118.1
(Continued)

FOREIGN PATENT DOCUMENTS

DE        4119623 C1    10/1992
DE   102013214776 A1 *  1/2015   ............... B64C 1/06
(Continued)

OTHER PUBLICATIONS

International Search Report; priority document.
German Search Report; priority document.

*Primary Examiner* — Joseph W Sanderson
(74) *Attorney, Agent, or Firm* — Greer, Burns & Crain, Ltd.

(57) ABSTRACT

A component system for an aircraft, having at least one furnishing component, a plurality of component rails, a plurality of guide elements engageable with and movable relative to the component rails, a plurality of retaining elements connected to the guide elements and configured to be coupled to a hull structure of the aircraft or the at least one furnishing component, and a plurality of locking units arranged on the component rails and/or on the guide elements and configured to lock the guide elements to a particular rail. At least two component rails are arranged on the at least one furnishing component or the hull structure at a distance and parallel to each other such that the furnishing component is retractable via the component rails on guide elements or component rails that are spatially fixed in the aircraft and can be locked in a retracted position by the locking units.

14 Claims, 6 Drawing Sheets

(56) References Cited

U.S. PATENT DOCUMENTS

| | | | | |
|---|---|---|---|---|
| 7,232,095 B2 * | 6/2007 | Park | | B64D 11/00 |
| | | | | 244/118.6 |
| 7,527,221 B2 * | 5/2009 | Humfeldt | | B64D 11/00 |
| | | | | 248/560 |
| 8,534,603 B2 * | 9/2013 | Grosse-Plankermann | | |
| | | | | B64F 5/10 |
| | | | | 244/119 |
| 8,690,102 B2 * | 4/2014 | Umlauft | | B64D 11/0696 |
| | | | | 244/131 |
| 10,017,252 B2 | 7/2018 | Jobst et al. | | |
| 10,046,843 B2 * | 8/2018 | Doran | | B64D 11/003 |
| 10,053,204 B2 * | 8/2018 | King | | B64D 11/00 |
| 10,604,048 B2 * | 3/2020 | Vela | | B64D 11/064 |
| 10,773,782 B2 * | 9/2020 | Metten | | B64C 1/06 |
| 11,136,124 B2 * | 10/2021 | Benthien | | F16D 33/00 |
| 11,505,334 B2 * | 11/2022 | Hegenbart | | F16B 45/02 |
| 2006/0049310 A1 * | 3/2006 | Park | | B64D 11/00 |
| | | | | 244/118.5 |
| 2006/0086886 A1 * | 4/2006 | Humfeldt | | B64D 11/00 |
| | | | | 248/636 |
| 2012/0145828 A1 | 6/2012 | Grosse-Plankermann et al. | | |
| 2012/0228431 A1 * | 9/2012 | Umlauft | | B64D 11/003 |
| | | | | 264/249 |
| 2016/0122019 A1 * | 5/2016 | Jobst | | A61G 3/00 |
| | | | | 244/118.5 |
| 2016/0304183 A1 | 10/2016 | Ahlen et al. | | |
| 2017/0057613 A1 * | 3/2017 | King | | B64D 11/00 |
| 2018/0009520 A1 * | 1/2018 | Metten | | B64C 1/06 |
| 2019/0193871 A1 | 6/2019 | Benthien | | |
| 2020/0324918 A1 * | 10/2020 | Hegenbart | | F16B 45/02 |

FOREIGN PATENT DOCUMENTS

| | | | |
|---|---|---|---|
| DE | 102014115747 A1 | | 5/2016 |
| DE | 102017131130 A1 | | 6/2019 |
| DE | 102019101401 A1 * | | 7/2020 |
| DE | 102019114147 A1 | | 12/2020 |
| WO | WO-2015079190 A1 * | 6/2015 | B62B 3/004 |

* cited by examiner

COMPONENT SYSTEM FOR INTERIOR FURNISHING OF AN AIRCRAFT

CROSS-REFERENCES TO RELATED APPLICATIONS

This application claims the benefit of the International Application No. PCT/EP2020/085574, filed on Dec. 10, 2020, and of the German patent application No. 102019134746.7 filed on Dec. 17, 2019, the entire disclosures of which are incorporated herein by way of reference.

FIELD OF THE INVENTION

The invention relates to a component system for interior furnishing of an aircraft, and to an aircraft with such a component system. The invention furthermore relates to a method for interior furnishing of an aircraft.

BACKGROUND OF THE INVENTION

Various concepts exist for the furnishing of cabins of an aircraft. Cabins are conventionally provided with a floor and paneling elements, and with numerous further furnishing components. These may include storage compartments, service units for passengers, monuments, passenger seats and diverse electric and electronic systems. Furthermore, air outlets and air ducts are provided and are arranged in, next to, behind, above or below furnishing components. Conventional methods are based on the manual, successive installation of all of the furnishing components which are introduced manually into the cabin, positioned and subsequently mounted. Modern methods comprise placing preinstalled modules on a carrier which is movable and raisable on the floor of the cabin.

For the correct placing of the individual furnishing components, use is frequently made of a position reference system permitting position reference from the outside, for example by placing laser projection lines in the interior of the cabin. By means of manual setting of the length of connecting rods, the furnishing components can be exactly set in their position, and therefore, in particular, if there is a multiplicity of successively arranged furnishing components, a harmonious, uniform appearance results. Dimensional tolerances of a fuselage structure are thereby compensated for.

SUMMARY OF THE INVENTION

Manually arranging furnishing components and then fastening them to a fuselage structure is very laborious. Although the use of a carrier which is movable on the floor facilitates the installation, nevertheless, during the movement of the carrier, the floor may yield elastically, and therefore immediate position accuracy cannot be guaranteed and a manual adjustment is necessary.

Consequently, it is an object of the invention to propose an installation system or similar which permits simple and rapid interior furnishing in an aircraft.

A component system for interior furnishing of an aircraft is proposed, having: at least one furnishing component, a plurality of component rails, a plurality of guide elements which can be brought into engagement with the component rails and are movable relative to the component rails, a plurality of holding elements which are connected to the guide elements and are designed to be coupled to a fuselage structure of the aircraft or to the at least one furnishing component, and a plurality of locking units which are arranged on the component rails and/or on the guide elements and are designed to lock the guide elements to a respective component rail, wherein at least two of the component rails are arranged on the at least one furnishing component or on the fuselage structure at a distance from and parallel to one another such that the furnishing component is insertable by means of the component rails by way of guide elements or component rails that are spatially fixed in the aircraft and is lockable at an inserted position by the locking units.

Accordingly, the component system has a novel design which facilitates the arranging and fastening of furnishing components. In this connection, a furnishing component should be understood as meaning a component which belongs to the furnishing of the cabin of the aircraft. In particular, these furnishing components can comprise storage compartments. They can be realized together with electric or electronic devices as a cohesive module. In addition, such a module can also comprise paneling elements or further storage compartments.

The substantial advantages of the component system according to the invention are achieved in particular with furnishing components which are arranged in a ceiling region of the cabin, i.e., in particular in an upper half or an upper third of the cabin cross section.

Component rails are preferably arranged on the furnishing component. A component rail is a rectilinear rail which is dimensionally stable and permits a relative displacement or movement of a guide element on the component rail. The component rails are formed in particular from a metallic material. It is recommended to provide a molded feature which permits a movement or displacement.

The component rails are connected rigidly to the relevant furnishing component or, if desired, alternatively to the fuselage structure, thus permitting a transmission of force between the guide elements and the furnishing component via the component rails. In one particular embodiment, the component rails can form an integral part of the relevant furnishing component and, for example, can also realize a reinforcing function. However, they can also be fixedly connected to the furnishing component as separate elements that are independent of the function of the furnishing component. Screw connections, adhesive connections or other suitable methods are appropriate for achieving highly loadable connections.

The guide elements should preferably be arranged on the fuselage structure of the aircraft. They can be provided as relatively simple components which are capable of entering into engagement with a component rail. The guide elements are placed on the fuselage structure or, if desired, alternatively on the furnishing component in such a manner that the component rails are displaceable thereon to a designated position in the interior. It is conceivable to arrange a plurality of guide elements one behind another in order to form a row of guide elements. A plurality of such rows can be arranged next to one another. It is preferred to distribute the rows over a ceiling region of the cabin and to push furnishing components of the ceiling region into the interior on the rows of guide elements.

If the component rails are arranged on the fuselage structure, it is expedient to select the distance of the component rails from the actual fuselage structure to be as small as possible. The holding elements are then connected to the relevant furnishing component and, at their ends directed toward the fuselage structure, carry the guide elements which can be brought into engagement with the component rails.

By means of the use of a plurality of component rails at a distance from one another, the spatial orientation of the furnishing component can be maintained when the relevant component rails are all in engagement with guide elements. By means of the arrangement of the component rails parallel to one another, it can be ensured that the entire furnishing component is displaceable via the component rails. The orientation of the component rails is selected here in particular to be parallel to a longitudinal axis of the cabin. Consequently, the furnishing component can be brought to a suitable position, for example by a movable carrier, in order, after production of an engagement between the component rails and the guide elements, to be displaced into an installation position.

The holding elements are provided to place the guide elements at the designated positions in the interior or on the furnishing components. The holding elements can differ in length, depending on the installation position.

By means of the component system according to the invention, the installation movement is decoupled from a cabin floor and the furnishing components are displaced directly in a designated orientation into the interior. During the installation, the cabin floor can remain free from furnishing components to be arranged in a ceiling region and can be temporarily used for other purposes. The interior will be significantly less blocked than is customary. Overall, the installation is thereby further simplified and the use of the interior is more flexible. For this purpose, the guide elements can be coupled to the fuselage structure in order to receive component rails arranged on the furnishing component. Alternatively thereto, the guide elements can be coupled to the furnishing component in order to receive component rails arranged on the fuselage structure.

In one particularly advantageous embodiment, the holding elements have an adjustable variable length. The variability enables the positions of the relevant guide elements to be able to be set exactly. It is preferred if the holding elements extend in a vertical direction from the fuselage structure in the direction of the cabin floor. Alternatively, the holding elements can extend from a relevant furnishing component in the direction of the fuselage structure. In the event of a curved fuselage, the lengths of holding elements lying next to one another differ if they end at the same height above the cabin floor.

In a further advantageous embodiment, the holding elements each have at least two portions which are displaceable with respect to one another and are lockable to one another in a variable position via a locking device in order to compensate for tolerances. It is conceivable to set the length of the holding elements before the furnishing elements are inserted. For this purpose, the locking device can be released in order to set the length. It is subsequently locked again, and therefore the length which has been set is maintained. It is furthermore also conceivable for the locking device to be opened only when the furnishing component is inserted. Compensation of tolerances in order to reach the precise end position would then be carried out by an external position reference system.

In a particularly preferred embodiment, the locking device comprises an electroactive polymer. The electroactive polymer is a particular arrangement of plastic materials that changes its shape under the action of an electrical voltage. For example, electroactive polymers are known which contract when an electrical voltage is applied and expand again to their original shape once the voltage is removed. A locking device could provide, for example, clamping or interlocking of elements which are movable relative to one another, with the clamping force or a movement in order to take up an interlocking position being brought about by the electroactive polymer. During the installation of the relevant furnishing component, the locking device could be supplied with an electrical voltage from the furnishing component or from a carrier carrying the furnishing component, such that the locking device is released. After adjustment of the position of the relevant furnishing component, the voltage is removed and the locking device is locked again such that the furnishing component remains in the adjusted position.

In a further advantageous embodiment, the component rail has at least one recess for receiving a relevant guide element. The recess can be present both on an outer side or an inner side. The recess can comprise a cavity, a slot, a hollow, a groove, an opening or other geometrical features which are suitable for receiving a guide element and for making guidance possible.

In one advantageous embodiment, the at least one recess comprises two recesses arranged on mutually opposite lateral portions of the component rail, and the guide elements have corresponding rolling bodies which are arranged on the guide elements in such a manner that they roll in the recesses. By means of the rolling bodies, a highly loadable connection between the guide elements and the component rails is made possible, similarly as in the case of a rolling bearing. The rolling bodies can be balls which roll during displacement of the furnishing component in the recess. They can be kept in position by means of a cage. Furthermore, the rolling bodies can be assigned to the guide elements such that the rolling bodies are always oriented correctly on the guide elements. The component rails can slide along the guide elements by means of the rolling bodies with little friction. The recesses and the rolling bodies are particularly preferably provided in a symmetrical arrangement. It is preferred if the rolling bodies are present in an encircling arrangement.

In a further advantageous embodiment, the locking units have a clamping device, said clamping devices each being arranged in a guide element in a portion facing a relevant component rail and being movable with respect to the component rail in order to enter into a frictional or form-fitting connection. The locking units can block the movability between the component rails and the relevant guide elements such that the furnishing component remains at the designated location. The direct arrangement between a guide element and a component rail permits a compact design.

In a similar manner as already explained previously, the clamping device can also have an actuator on the basis of an electroactive polymer. By application of an electrical voltage to the relevant actuator, a contraction can be brought about leading to release of the locking unit. Removal of the voltage subsequently leads to re-expansion of the polymer such that the clamping device carries out clamping.

It is advantageous if the clamping device has a toothing which corresponds to a toothing on the component rail. The necessary force for the locking unit can be reduced by the toothing since essentially merely the positioning of a toothed element on a toothing of the component rail suffices in order to take up a form-fitting connection.

The component system particularly advantageously has a plurality of furnishing components which are connectable to one another on the end faces. This can prevent a vibration-induced relative movement of the individual furnishing components. Alternatively thereto, gaps could also remain which are spanned by elastic sealing elements.

The invention furthermore relates to an aircraft, having a fuselage and at least one above-described component system which is coupled to a fuselage structure of the fuselage. The fuselage structure can comprise, in particular, a plurality of frames which are distributed at a distance from one another along a longitudinal direction.

In a further advantageous embodiment, the holding elements are arranged on an upper half of the fuselage structure. The holding elements could be connected to the fuselage structure via structural connecting elements. The upper half of the fuselage structure is directed to the arrangement of ceiling modules, i.e., for example, overhead storage components at the sides or in a central region.

The furnishing component could furthermore be a lateral and/or central overhead module. The module can also comprise electrical or electronic fittings which are arranged behind or above storage compartments.

The invention is furthermore directed to a method for interior furnishing of an aircraft, having the steps of: arranging at least two component rails on a furnishing component or on a fuselage structure of the aircraft at a distance from and parallel to one another, arranging guide elements with holding elements on the fuselage structure or on the furnishing component of the aircraft, producing an engagement between the component rails and the guide elements and moving the furnishing component to a designated position, and locking the guide elements in an inserted position to a respective component rail with the aid of locking units which are arranged on the component rails and/or on the guide elements.

BRIEF DESCRIPTION OF THE DRAWINGS

Further features, advantages and possible uses of the present invention emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED DESCRIPTION OF THE PREFERRED EMBODIMENTS

Figure 1:
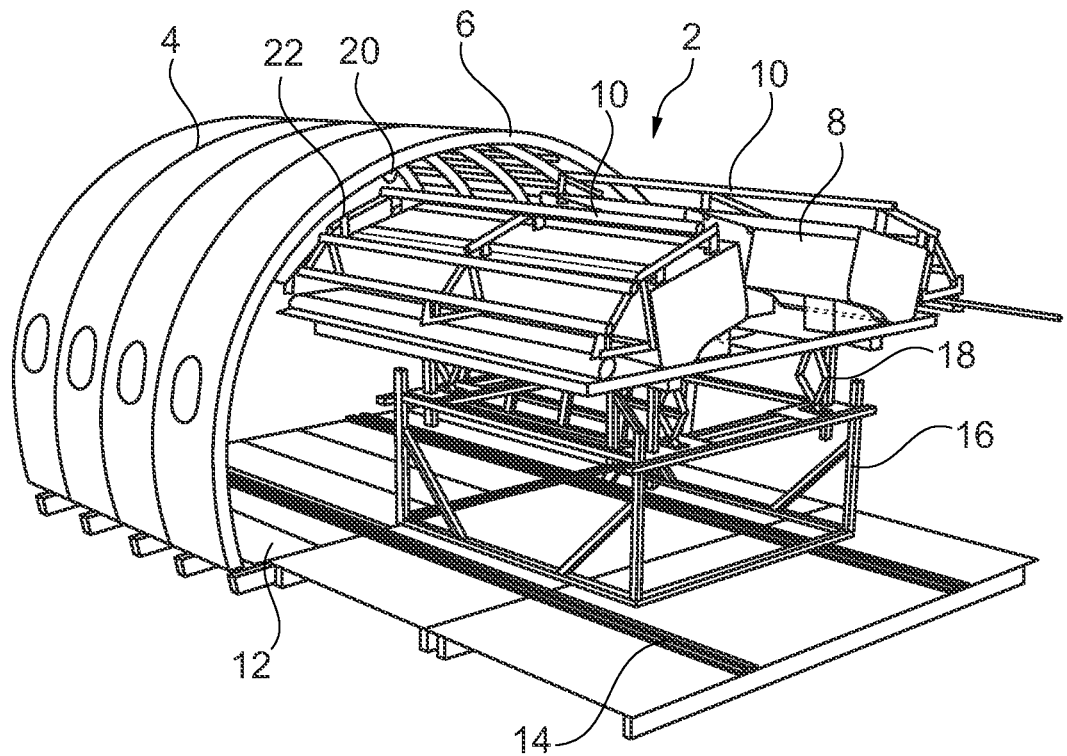
FIG. 1 shows a three-dimensional view of a component system during the installation.

FIG. 1 shows a component system 2 for interior furnishing of an aircraft. The aircraft is indicated here merely by a part of a fuselage 4 that has a fuselage structure 6. Furnishing components 8 are to be arranged or to be fastened in an upper part of the fuselage 4.

The furnishing components 8 each have a plurality of component rails 10 which are fastened rigidly to upper sides of the furnishing components 8. They are preferably produced from a metallic material and are sufficiently dimensioned to absorb the load of the furnishing components 8. The component rails 10 of a furnishing component 8 are arranged parallel to and at a distance from one another. They preferably extend along a longitudinal direction of the fuselage 4 when they are oriented for installation.

On a floor lying in front of the cabin floor 12 and being provided with floor rails 14, a carrier 16 is movably visible. The carrier 16 has a plurality of lifting devices 18 which are provided to move the furnishing components 8 vertically.

The fuselage structure 6 is coupled to guide elements 20 which are configured in a corresponding manner to the component rails 10. By raising of the furnishing components 8, the latter can be brought to the same height as the guide elements 20. The furnishing components 8 can be moved by means of the carrier 16 to the fuselage structure 6 in order subsequently to introduce the component rails 10 into the guide elements 20. The furnishing components 8 can be inserted on the latter into the fuselage 4.

The guide elements 20 are arranged on holding elements 22 which are coupled to the fuselage structure 6. As explained further below, said holding elements can have a variable length in order to permit tolerances to be compensated for.

Figure 2A:
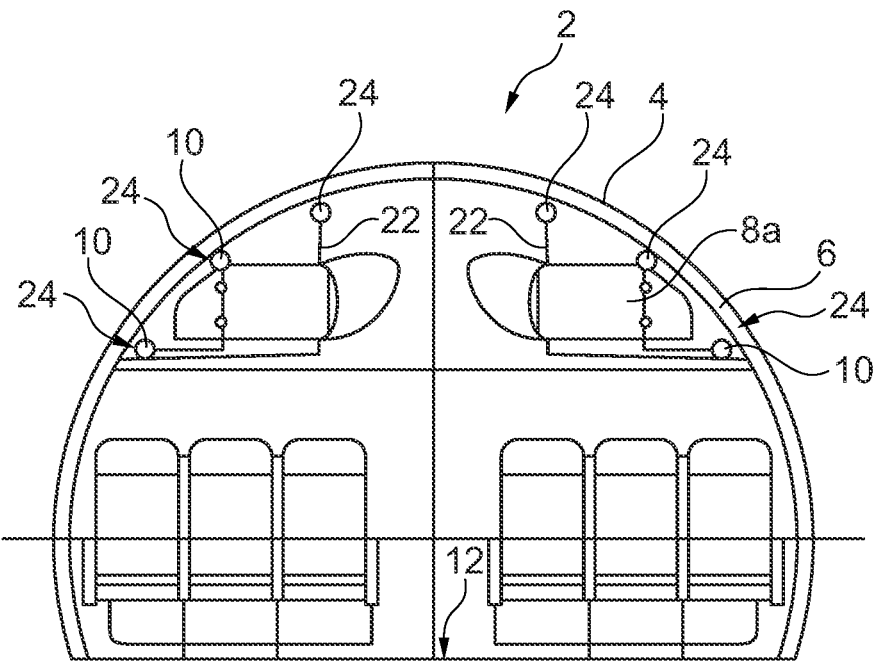
FIGS. 2a to 2d show a plurality of variants of the interior furnishing with various furnishing components in schematic cross-sectional illustrations.

FIG. 2a shows an arrangement with a central aisle and rows of seats adjoining the latter on the outside and each having three passenger seats. Above the latter there are two furnishing components 8a which are located on mutually opposite sides and are realized in the form of lateral overhead storage compartments. The latter, as illustrated above, are coupled via component rails to guide elements 20 which, in turn, are attached by holding elements 22 to structural connecting elements 24.

Figure 2B:
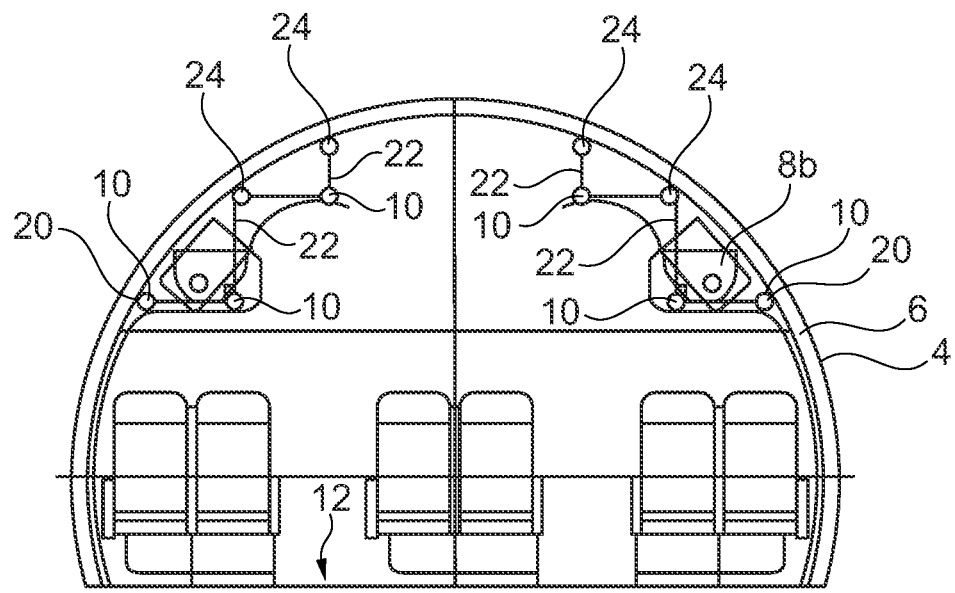

FIG. 2b shows a modified variant with two aisles running parallel to one another and, in each case, two adjacent passenger seats in two lateral and one central region. Furnishing components 8b which are likewise designed as overhead storage compartments are provided here. In order to improve the sensation of space for passengers in the aisles, the storage compartments in this case can be configured to be somewhat more compact and can protrude less far into the cabin.

Figure 2C:
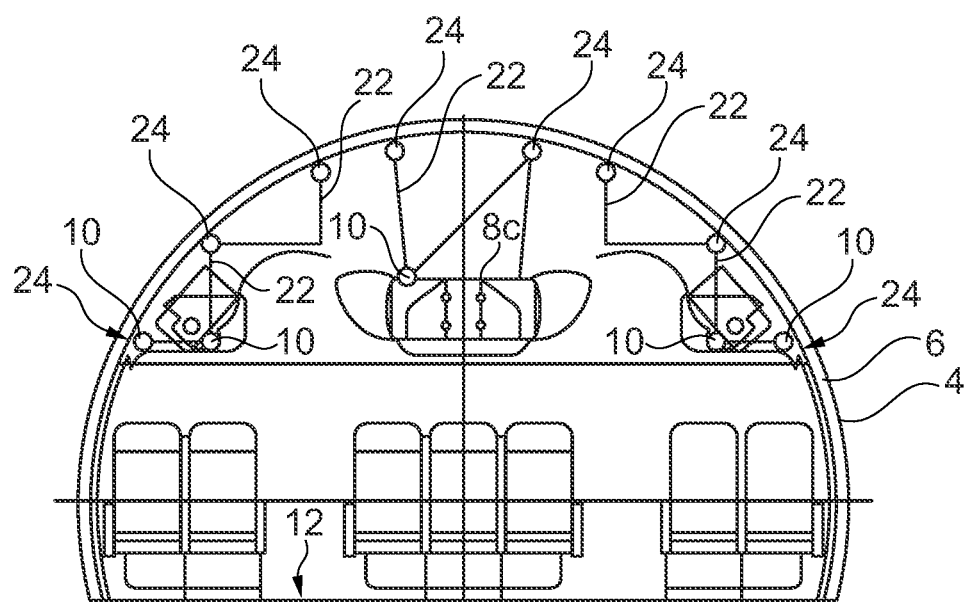

FIG. 2c shows a further variant in which a central region is provided with three passenger seats located next to one another. In addition to furnishing components 8b, as in FIG. 2b, a central module is provided in the form of a furnishing component 8c. The latter is provided above the central passenger seats.

Figure 2D:
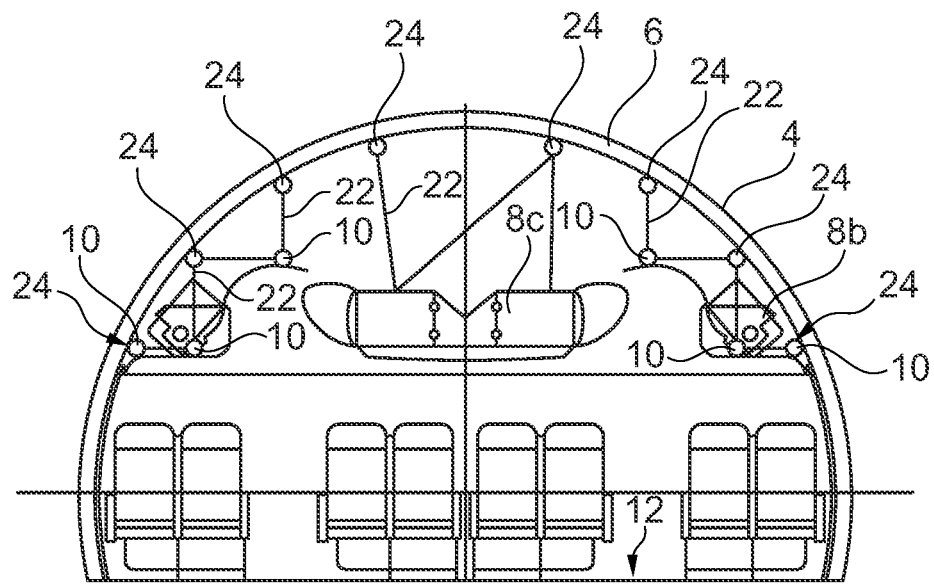

FIG. 2d also shows, by way of example, a variant in which a central region can be provided with four passenger seats. The basic design is similar to that in FIG. 2c.

Figure 3A:
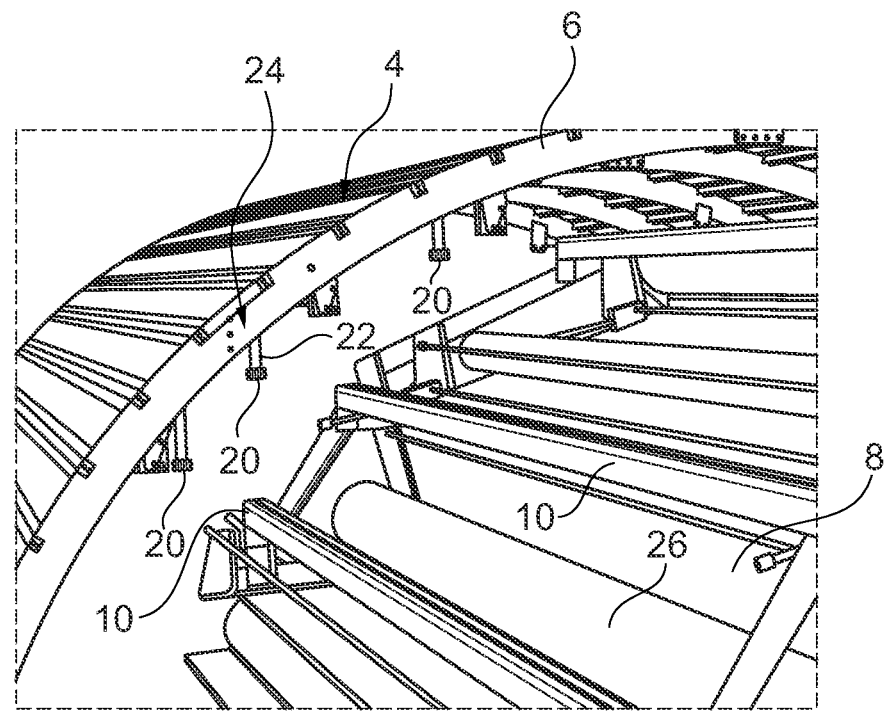
FIGS. 3a to 3c show a plurality of detailed views in different enlargements.
Figure 3B:
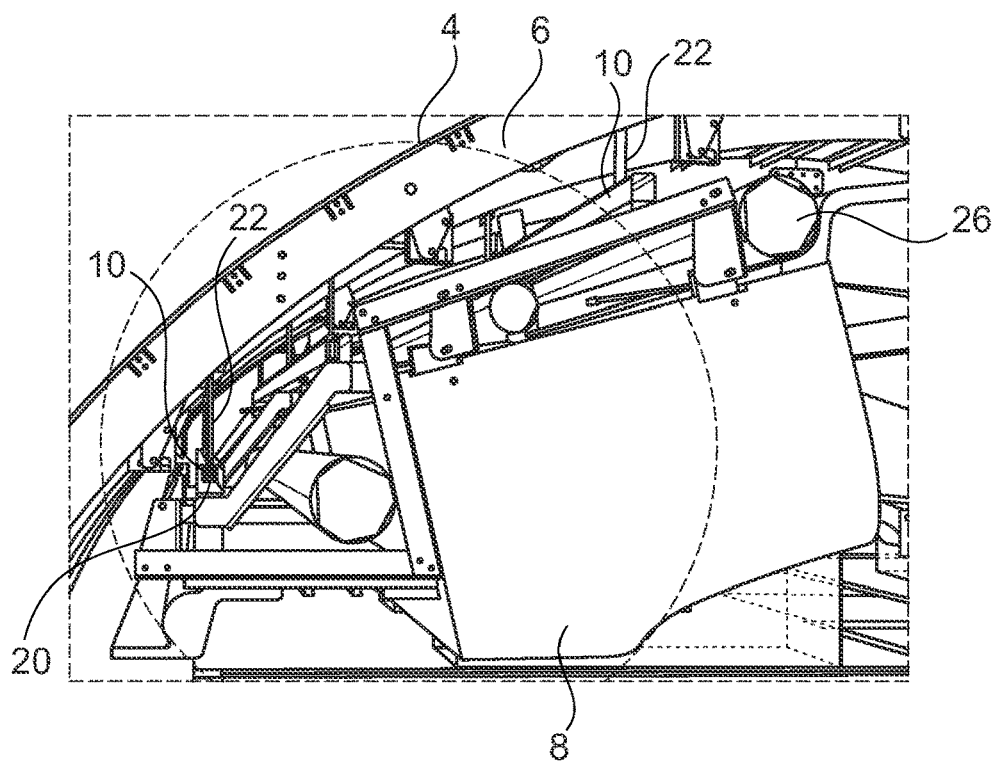
Figure 3C:
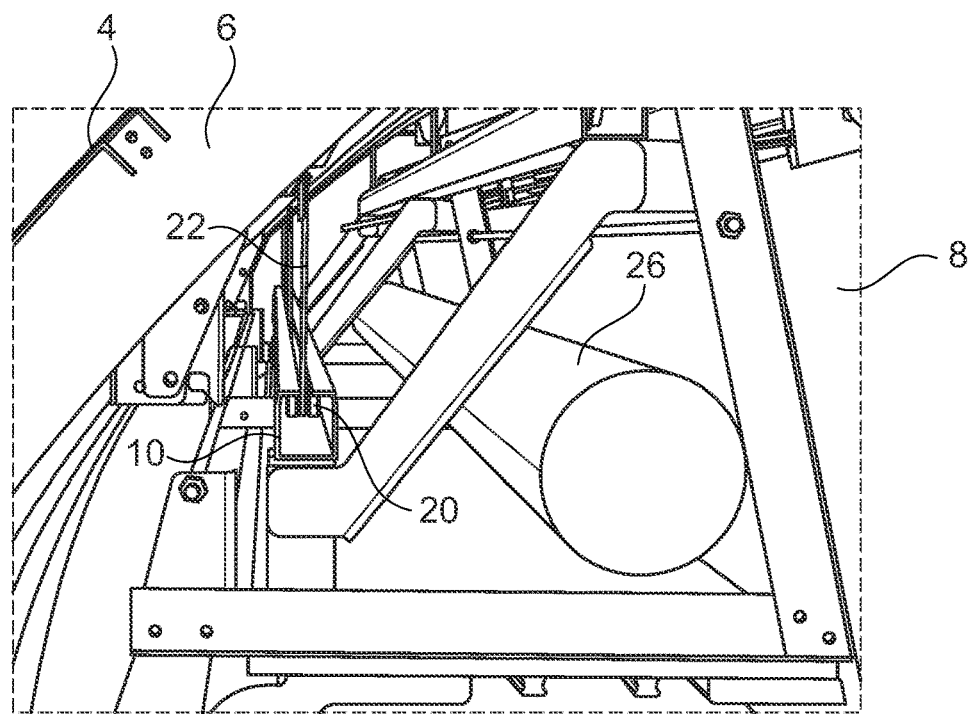

FIGS. 3a to 3c show the component rails 10, by way of example, as square profiles which enclose a cavity that is accessible via a slot located on an upper side of the component rails 10. The guide elements 20 are realized, by way of example, as rollers which are dimensioned so as to correspond to the cavity. The guide elements 20 can consequently run in the component rails 10. The holding elements 22 protrude here outward through the slot toward the fuselage structure 6. Accordingly, the furnishing component 8 can be very simply displaced along the longitudinal direction of the fuselage 4 and thus displaced to a designated position.

It is provided, by way of example, also to arrange air ducts 26 of an air conditioning system on a side of the furnishing component 8 that faces the fuselage structure 6. The furnishing component 8 is consequently preferably a fully equipped module which, once preassembled, merely still has to be inserted and locked. The air ducts 26 of a plurality of successive furnishing components 8 can be coupled to one another by corresponding connectors. It would also be possible to provide electric or electronic components which are preferably coupled to corresponding electric or electronic components of adjacent furnishing components 8 via self-locking electric connectors. Where possible, wireless connections could also be provided. The latter can comprise inductive or radio-based technologies.

Figure 4A:
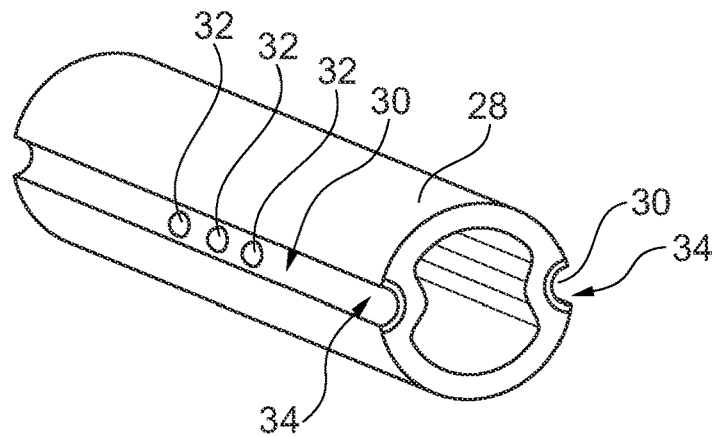
FIGS. 4a to 4c show a component rail, a guide element and a locking unit.
Figure 4B:
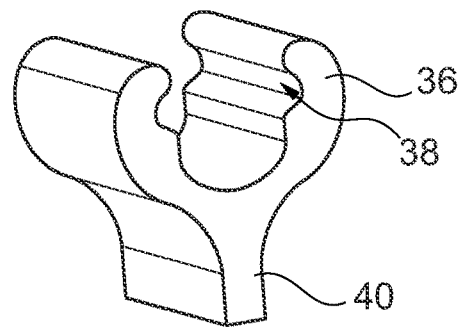
Figure 4C:
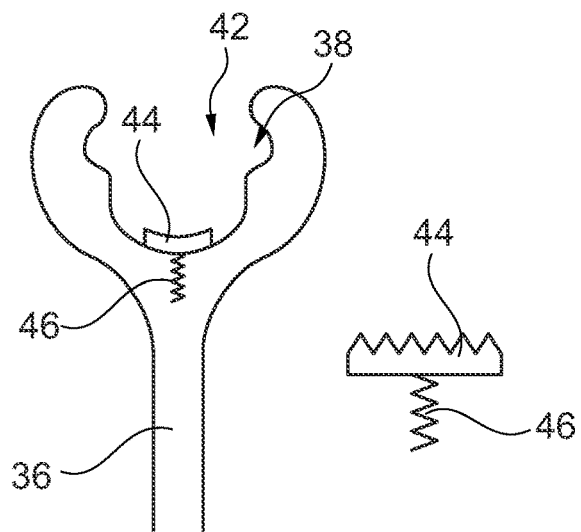

FIGS. 4a to 4c disclose an alternative component rail 28 which has a respective recess 30 on two mutually opposite side surfaces. The recesses preferably extend over the entire length of the respective component rail 28 and are designed to receive rolling bodies 32. The latter can roll along the recess 30 and can thus minimize the frictional resistance during the displacement of the component rail 28. For the introduction of the rolling bodies 32, the recesses 30 each have a rail inlet 34 at which the recess is of such a depth that the rolling bodies can enter the recesses 30.

FIG. 4b shows a guide element 36 which has two mutually opposite hollows 38 which correspond to the recesses 30. These are jointly capable of guiding the rolling bodies 32. The guide element 36 is connected via a flange 40 to a holding element or merges therein.

FIG. 4c shows a locking unit 42 in the guide element 36 which has a clamping device 44 and an actuator 46. The clamping device 44 is toothed and can be brought into engagement with a toothing, not illustrated in detail here, of the component rail 28.

The actuator 46 can have an arrangement of an electroactive polymer which contracts when a voltage is applied and thus retracts the clamping device 44 in the direction of the flange 40 and therefore releases the locking unit 42. If the voltage is removed, the actuator 46 expands again and locks the guide element 36 on the component rail 28.

Figure 5:
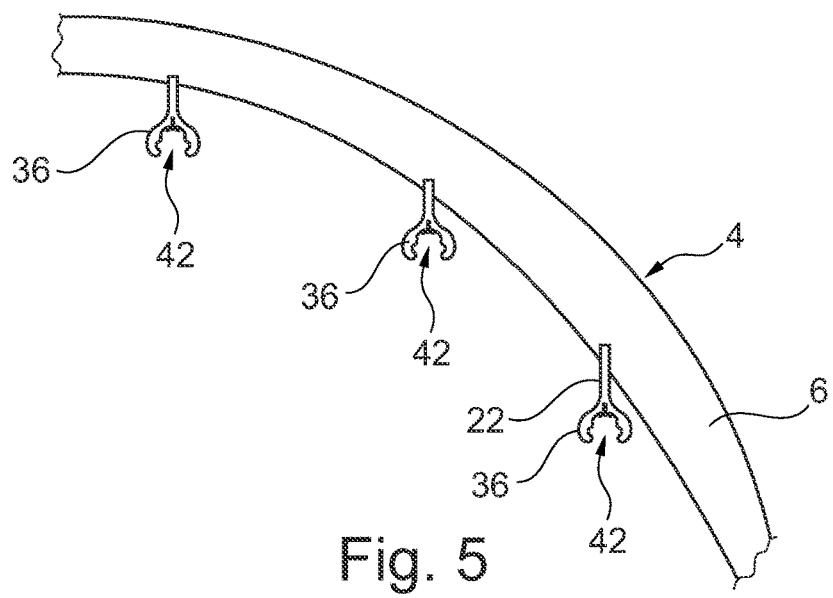
FIG. 5 shows a fuselage structure with holding elements and guide elements arranged thereon.

FIG. 5 shows the fuselage structure 6 on which the guide elements 36 are arranged on holding elements 22 and are open downward, i.e., in the direction of the cabin floor 12, in order to receive component rails 28.

Figure 6:
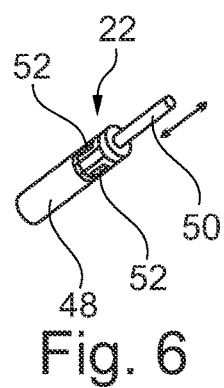
FIG. 6 shows a schematic illustration of a holding element with a variable length and a locking unit which is integrated therein and is on the basis of an electroactive polymer.

FIG. 6 shows a holding element 22 with a first portion 48 and a second portion 50 which is guided movably therein. Between the two portions 48 and 50, a symmetrical arrangement of an electroactive polymer 52 is located on the inner side of the first portion 48. The electroactive polymer can be contracted by application of a voltage such that the second portion 50 is freely displaceable in the first portion 48. If the voltage is removed, the electroactive polymer 52 expands again and consequently clamps the two portions 48 and 50. The movement thereof relative to one another is consequently inhibited and therefore a locking unit is realized. The holding element 22 can accordingly be simply adjusted in its length in order to compensate for tolerances.

Figure 7:
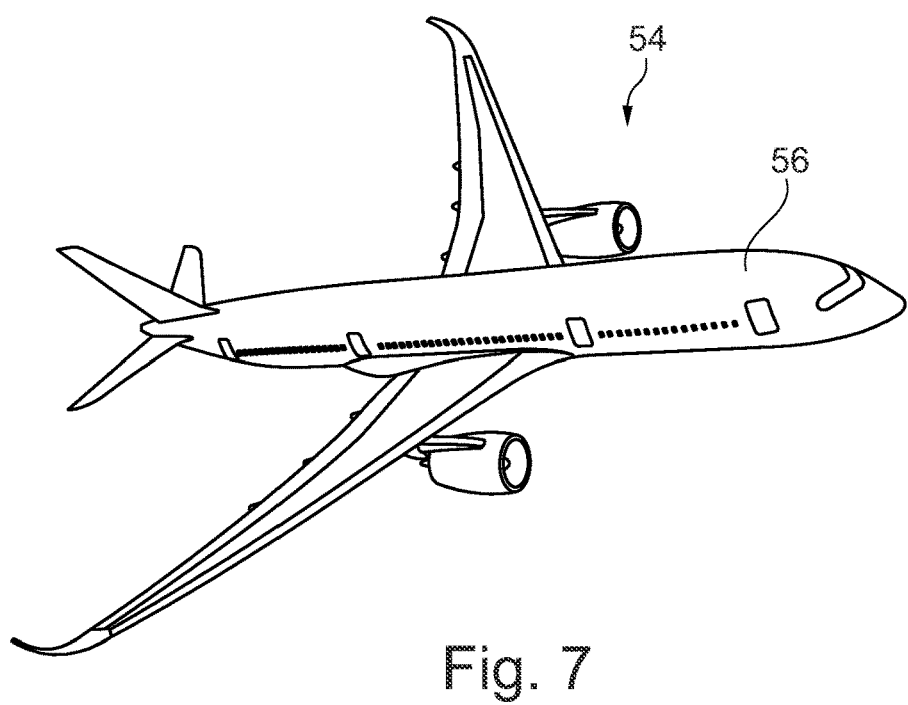
FIG. 7 shows an aircraft.

FIG. 7 finally shows an aircraft 54 which has a passenger cabin 56 in which a component system 2 according to the invention is arranged.

It is additionally pointed out that "having" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Component system
4 Fuselage
6 Fuselage structure
8, 8a, 8b, 8c Furnishing component
10 Component rail
12 Cabin floor
14 Floor rail
16 Carrier
18 Lifting device
20 Guide element
22 Holding element
24 Structural connecting element
26 Media line
28 Component rail
30 Recess
32 Rolling body
34 Rail inlet
36 Guide element
38 Hollow
40 Flange
42 Locking unit
44 Clamping device
46 Actuator
48 First portion
50 Second portion
52 Electroactive polymer
54 Aircraft
56 Cabin

The invention claimed is:

1. A component system for interior furnishing of an aircraft, comprising:
  at least one furnishing component comprising an overhead storage compartment and a length of a duct positioned between a rear wall of the overhead storage compartment and a fuselage structure of the aircraft, the overhead storage compartment and the length of duct joined as a module,
  a plurality of component rails extending parallel to a longitudinal axis of the aircraft and located radially outwardly from the overhead storage compartment,
  a plurality of guide elements which are engageable with the component rails and are movable relative to the component rails, such that the at least one furnishing component traverses parallel to the longitudinal axis via the plurality of component rails, a plurality of holding elements which are connected to the guide elements and are configured to be coupled to the fuselage structure of the aircraft or to the at least one furnishing component, and a plurality of locking units which are arranged on at least one of the component rails or on the guide elements and are configured to lock the guide elements to a respective component rail, wherein at least two of the component rails are arranged on the at least one furnishing component or on the fuselage structure at a distance from and parallel to one another such that the furnishing component is insertable by means of the component rails by way of guide elements or component rails that are spatially fixed in the aircraft and is lockable at an inserted position by the locking units.

2. The component system as claimed in claim 1, wherein the holding elements have an adjustable variable length.

3. The component system as claimed in claim 2, wherein the holding elements have at least two portions which are displaceable with respect to one another and are lockable to one another in a variable position via a locking device to compensate for tolerances.

4. The component system as claimed in claim 3, wherein the locking device comprises an electroactive polymer.

5. The component system as claimed in claim 1, wherein the component rail has at least one recess for receiving a respective guide element.

6. The component system as claimed in claim 5, wherein the at least one recess comprises two recesses arranged on mutually opposite lateral portions of the component rail, and the guide elements have corresponding rolling bodies which are arranged on the guide elements in such a manner that they roll in the recesses.

7. The component system as claimed in claim 1, wherein the locking units each have a clamping device, said clamping devices each being arranged in a guide element in a portion facing a respective component rail and being movable with respect to the component rail to enter into a frictional or form-fitting connection.

8. The component system as claimed in claim 7, wherein the clamping device has an actuator formed of an electroactive polymer.

9. The component system as claimed in claim 7, wherein the clamping device has a toothing which corresponds to a toothing on the component rail.

10. The component system as claimed in claim 1, wherein the at least one furnishing component comprises a plurality of furnishing components which are connectable to one another on the end faces.

11. An aircraft, comprising:
a fuselage, and
at least one component system as claimed in claim 1 which is coupled to a fuselage structure of the fuselage.

12. The aircraft as claimed in claim 11, wherein the holding elements are arranged on an upper half of the fuselage structure.

13. The aircraft as claimed in claim 11, wherein the furnishing component is at least one of a lateral or central overhead module.

14. A method for interior furnishing of an aircraft, comprising the steps of:

arranging at least two component rails on a furnishing component or on a fuselage structure of the aircraft at a distance from and parallel to one another, arranging guide elements with holding elements on the fuselage structure or on the furnishing component of the aircraft, producing an engagement between the component rails and the guide elements and moving the furnishing component to a designated installation position, such that the furnishing component traverses parallel to a longitudinal axis of the aircraft via the at least two component rails, and locking the guide elements in an inserted position to a respective component rail aided by locking units which are arranged on at least one of the component rails or the guide elements, wherein the furnishing component comprises an overhead storage compartment and a length of a duct positioned between a rear wall of the overhead storage compartment and the fuselage structure of the aircraft in the designated installation position, wherein the at least two component rails extend parallel to the longitudinal axis of the aircraft and are located radially outwardly from the overhead storage compartment, wherein the overhead storage compartment and the length of duct are joined as a module prior to the moving of the furnishing component to the designated installation position step.

* * * * *